(12) United States Patent
Varnhagen et al.

(10) Patent No.: US 11,975,742 B2
(45) Date of Patent: May 7, 2024

(54) TRAJECTORY CONSISTENCY MEASUREMENT FOR AUTONOMOUS VEHICLE OPERATION

(71) Applicant: FORD GLOBAL TECHNOLOGIES, LLC, Dearborn, MI (US)

(72) Inventors: Scott Julian Varnhagen, Ann Arbor, MI (US); Colen McAlister, Sunnyvale, CA (US); Timothy Andrew Potts, Jr., Sunnyvale, CA (US); David Breeden, Belmont, CA (US); Pragati Satpute, Canton, MI (US); Alice Kassar, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 431 days.

(21) Appl. No.: 17/329,279

(22) Filed: May 25, 2021

(65) Prior Publication Data

US 2022/0379928 A1    Dec. 1, 2022

(51) Int. Cl.
*B60W 60/00* (2020.01)
*G07C 5/08* (2006.01)

(52) U.S. Cl.
CPC .......... *B60W 60/00274* (2020.02); *B60W 60/00272* (2020.02); *G07C 5/085* (2013.01); *B60W 2420/403* (2013.01); *B60W 2420/408* (2024.01)

(58) Field of Classification Search
None
See application file for complete search history.

(56) References Cited

U.S. PATENT DOCUMENTS 9,227,632 B1 * 1/2016 Lee ................... B60W 30/0956
9,568,915 B1 * 2/2017 Berntorp ............. G05D 1/0214
(Continued)

FOREIGN PATENT DOCUMENTS

CN    113728212 A    11/2021
EP    3699053 A1    8/2020
(Continued)

OTHER PUBLICATIONS

Lim, Wonteak et al., "Hikerarchical Trajectory Planning of an Autonomous Car Based on the Integration of a Sampling and an Optimization Method," https://www.researchgate.net/publication/322202031, IEEE Transactions on Intelligent Transportation Systems, Feb. 2018.

(Continued)

*Primary Examiner* — James J Lee
*Assistant Examiner* — Wenyuan Yang
(74) *Attorney, Agent, or Firm* — Frank A. MacKenzie; Brooks Kushman P.C.

(57) ABSTRACT

Methods of refining a planned trajectory of an autonomous vehicle are disclose. For multiple cycles as the vehicle moves along the trajectory, the vehicle will perceive nearby objects. The vehicle will use the perceived object data to calculate a set of candidate updated trajectories. The motion planning system will measure a discrepancy between each candidate updated trajectory and the current trajectory by: (i) determining waypoints along each trajectory; (ii) determining distances between at least some of the waypoints; and (iii) using the distances to measure the discrepancy between the updated trajectory and the current trajectory. The system will use the discrepancy to select, from the set of candidate updated trajectories, a final updated trajectory for the vehicle to follow.

19 Claims, 9 Drawing Sheets

(56) References Cited

U.S. PATENT DOCUMENTS

| | | | | |
|---|---|---|---|---|
| 2016/0341561 A1* | 11/2016 | Woolley | ............. | G01C 21/3658 |
| 2020/0269873 A1* | 8/2020 | Liu | ................... | B60W 50/0097 |
| 2020/0310446 A1* | 10/2020 | Zhu | ................... | B60W 60/0015 |
| 2021/0114617 A1* | 4/2021 | Phillips | ............. | B60W 30/0956 |

FOREIGN PATENT DOCUMENTS

| | | | |
|---|---|---|---|
| EP | 3779364 A1 | 2/2021 | |
| WO | 2020079069 A2 | 4/2020 | |

OTHER PUBLICATIONS

International Search Report of PCT/US2022/071807 dated Oct. 20, 2022, 5 pages.

International Preliminary Report on Patentability PCT/US2022/071807 dated Nov. 21, 2023, 5 pages.

\* cited by examiner

TRAJECTORY CONSISTENCY MEASUREMENT FOR AUTONOMOUS VEHICLE OPERATION

BACKGROUND

When an autonomous vehicle (AV) moves through an environment, the AV's on-board motion planning system calculates a trajectory for the AV to follow. The system constantly recalculates the trajectory over multiple cycles as the AV moves and encounters actors and other objects that are in or near its path. When doing this, during each cycle the system will determine multiple possible trajectories, and it will select one of the candidate trajectories to follow. This is a computationally intensive process. In addition, the AV must perform the calculation and selection quickly, in real-time as the AV moves. If when doing this the AV repeatedly selects trajectories that have significant changes, this can result in undesired ride quality, such as halts, jukes and a general feeling of hesitancy.

This document describes methods and systems that are directed to addressing the problems described above, and/or other issues.

SUMMARY

This document describes methods of refining a planned trajectory of an autonomous vehicle as the vehicle moves through an environment. To accomplish this, a motion planning system of an autonomous vehicle will calculate a current trajectory for the vehicle. A control system of the vehicle will move the vehicle along the current trajectory. Then, for each cycle of various cycles as the vehicle moves along the current trajectory, a perception system of the vehicle will capture perception data about objects that are within a detection range of the perception system as the vehicle moves along the current trajectory. The vehicle's motion planning system will use the perception data to calculate a set of candidate updated trajectories. The motion planning system will measure a discrepancy between each candidate updated trajectory and the current trajectory by: (i) determining waypoints along the current trajectory and waypoints along the candidate updated trajectory; (ii) determining distances between at least some of the waypoints of the current trajectory and at least some of the waypoints of the candidate updated trajectory; and (iii) using the distances to measure the discrepancy between the updated trajectory and the current trajectory. The system will store the discrepancy in a vehicle log. The system also will use the discrepancy to select, from the set of candidate updated trajectories, a final updated trajectory for the autonomous vehicle to follow.

In some embodiments, when determining the waypoints along the current trajectory and the waypoints along the candidate updated trajectory, the system may, for either the current trajectory or the candidate updated trajectory, periodically assign one of the waypoints at periodic intervals from a start time or distance. For the other of the current trajectory or the candidate updated trajectory, the system will use the assigned waypoints to generate interpolated waypoints at corresponding periodic intervals.

In some embodiments, when using the distances to measure the discrepancy, the system may aggregate the distances determined over a planning time horizon, and it may then measure the discrepancy as a function of the aggregated distances, wherein the function comprises one or more of the following: (i) a maximum absolute value of the aggregated distances; (ii) a maximum signed value of the aggregated distances; (iii) a minimum signed value of the aggregated distances; or (iv) root mean square error of the aggregated distances.

In some embodiments, when using the distances to measure the discrepancies, the system may, for each pair of aligned waypoints in the current trajectory and the candidate updated trajectory, measure a difference in position, orientation, and/or pose of the vehicle.

In some embodiments, when using the discrepancy to select the final updated trajectory, the system may select the candidate updated trajectory having the smallest discrepancy.

In some embodiments, when using the discrepancy to select the final updated trajectory the system may use the discrepancies for each candidate updated trajectory and one or more other parameters in a cost function for that candidate updated trajectory. The system may then select the candidate updated trajectory having the lowest cost.

In some embodiments, the system also may: (i) identify a time window that includes the plurality of cycles; (ii) determine a number of candidate updated trajectories for which the measured discrepancy exceeded a discrepancy threshold value; (iii) determine whether at least a minimum number of candidate updated trajectories had a measured discrepancy that exceeded the discrepancy threshold value; and (iv) in response to determining that at least a minimum number of candidate updated trajectories had a measured discrepancy that exceeded the discrepancy threshold value, logging the time window as an inconsistency event.

In some embodiments, the vehicle may transfer the vehicle log to an offboard processing system. The offboard processing system may then determine the number of candidate updated trajectories, determine whether at least the minimum number of candidate updated trajectories had a measured discrepancy that exceeded the discrepancy threshold value, and log the time window as an inconsistency event.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." In this document, when relative terms of order such as "first" and "second" are used to modify a noun, such use is simply intended to distinguish one item from another, and is not intended to require a sequential order unless specifically stated.

Definitions for additional terms that are relevant to this document are included at the end of this Detailed Description.

Figure 1:
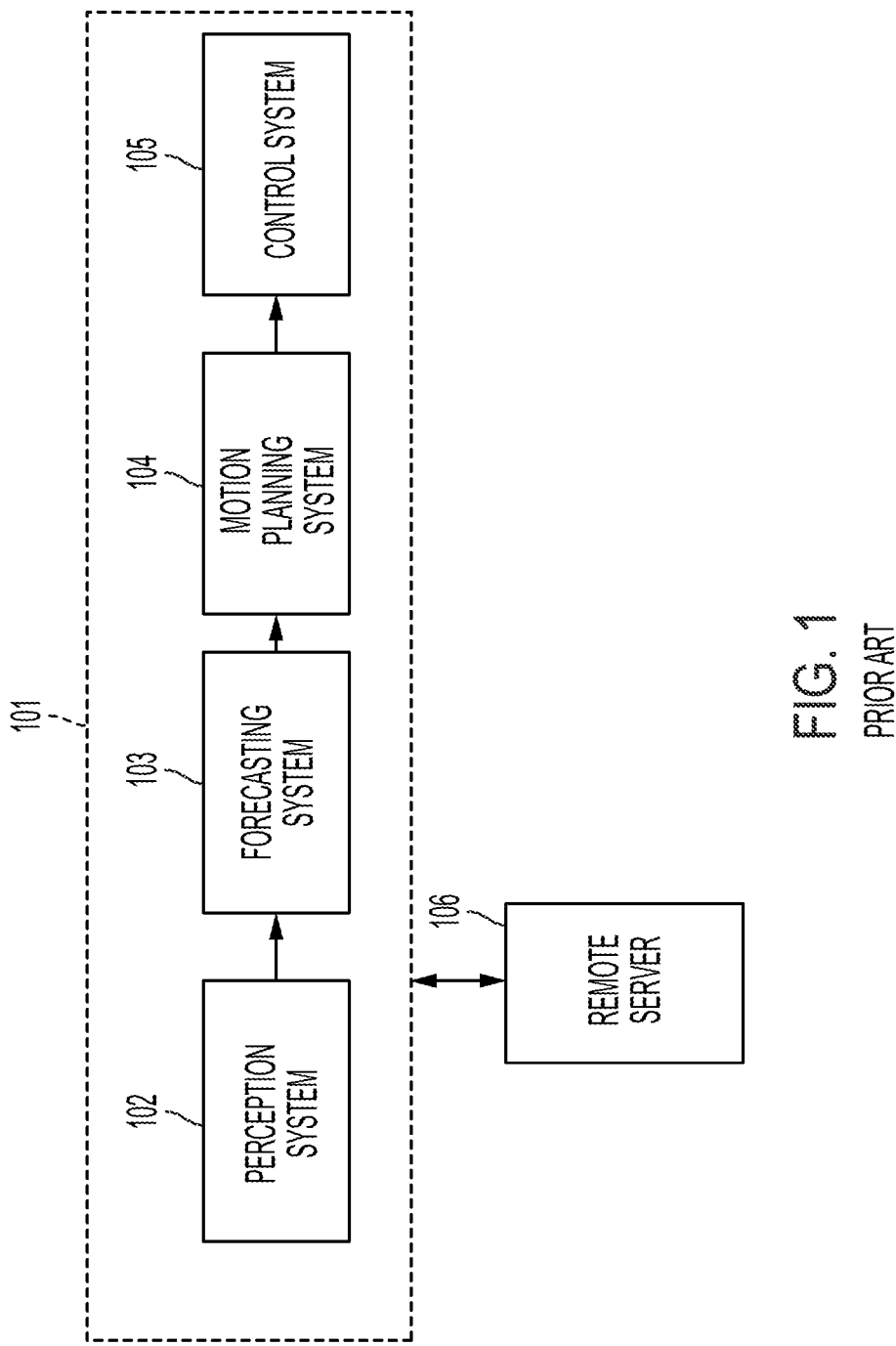
FIG. 1 illustrates example systems and components of an autonomous vehicle.

Before describing the details of the trajectory assessment processes that will be claimed in this document, it is useful to provide some background information about autonomous vehicle (AV) systems. FIG. 1 shows a high-level overview of AV subsystems that may be relevant to the discussion below. Specific components within such systems will be described in the discussion of FIG. 8 later in this document. Certain components of the subsystems may be embodied in processor hardware and computer-readable programming instructions that are part of the AV's on-board computing system 101. The subsystems may include a perception system 102 that includes sensors that capture information about moving actors and other objects that exist in the vehicle's immediate surroundings. Example sensors include cameras, LiDAR sensors and radar sensors. The digital images, LiDAR point cloud data, radar data and/or other data captured by such sensors are known as perception data.

The perception system may include one or more processors, and computer-readable memory with programming instructions and/or trained artificial intelligence models that, during a run of the AV, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in Yurtsever et al., "A Survey of Autonomous Driving: Common Practices and Emerging Technologies" (arXiv Apr. 2, 2020).

The vehicle's perception system 102 may deliver perception data to the vehicle's forecasting system 103. The forecasting system (which also may be referred to as a prediction system) will include processors and computer-readable programming instructions that are configured to process data received from the perception system and forecast actions of other actors that the perception system detects.

The vehicle's perception system, as well as the vehicle's forecasting system, will deliver data and information to the vehicle's motion planning system 104 and control system 105 so that the receiving systems may assess such data and initiate any number of reactive motions to such data. The motion planning system 104 and control system 105 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

During deployment of the AV, the AV receives perception data from one or more sensors of the AV's perception system. The perception data may include data representative of one or more objects in the environment. The perception system will process the data to identify objects and assign categorical labels and unique identifiers to each object detected in a scene.

Figure 2:
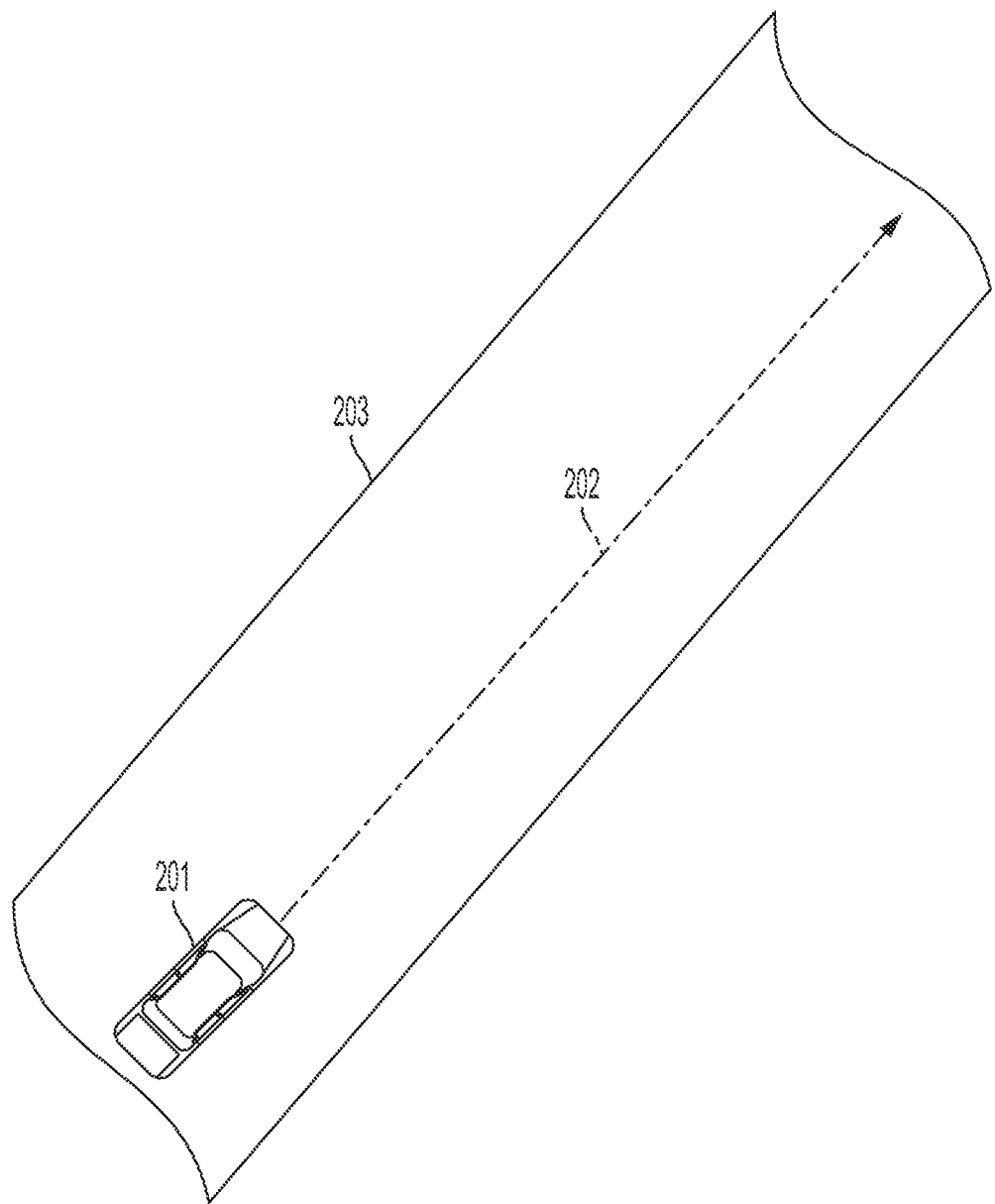
FIG. 2 illustrates an example of an autonomous vehicle following a trajectory along a path.

FIG. 2 illustrates an example of an AV 201 traveling along a path that includes a road 203. To travel along the path, the vehicle is following a trajectory 202 that its motion planning system determined. As the AV 201 continues to move, the perception system of the AV 201 will gather perception data to detect actors and other objects that are within range of its sensors. The actors or other objects may include, other vehicles, pedestrians, bicycles, animals and/or other items.

Figure 3:
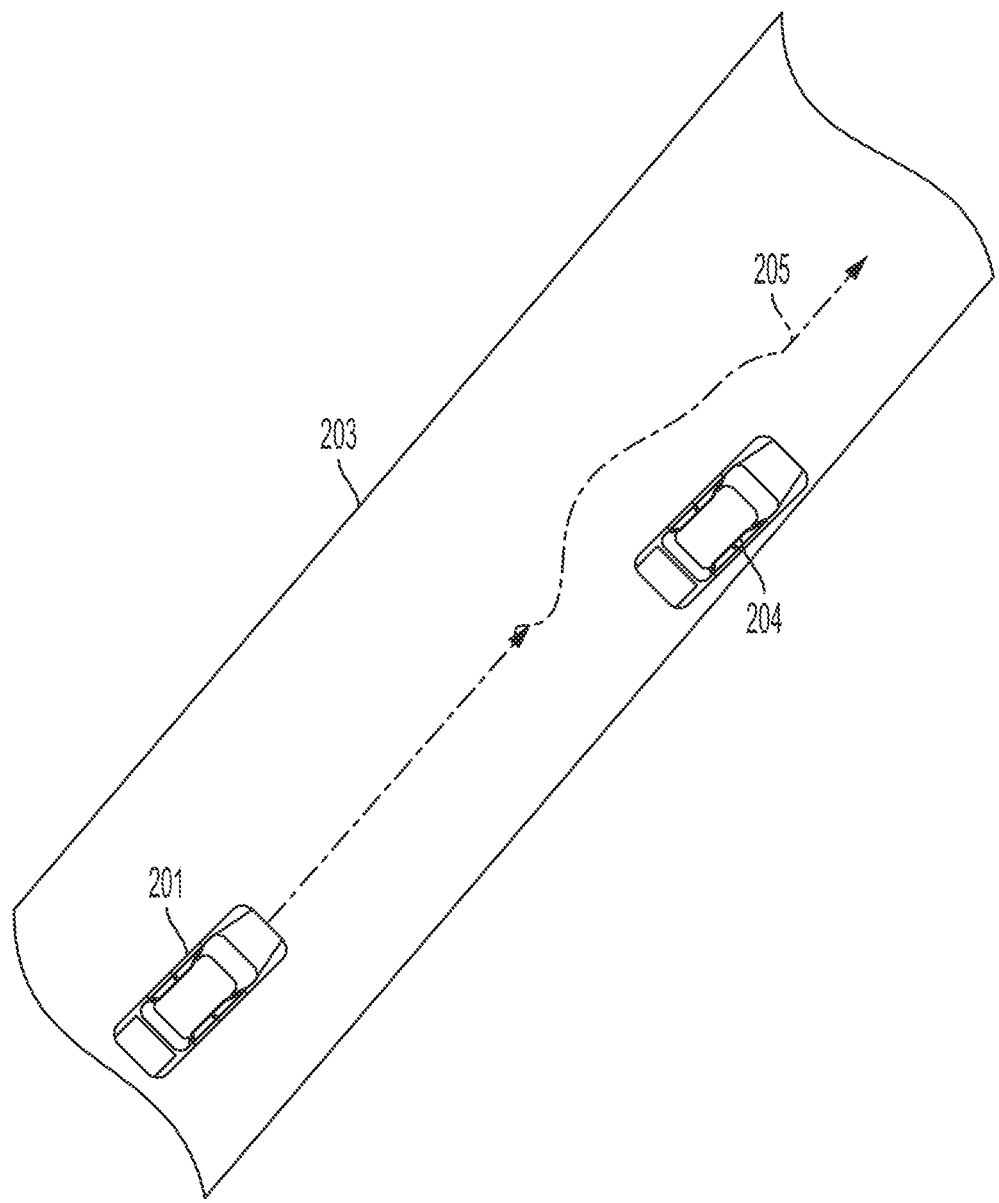
FIG. 3 illustrates an example of a situation in which the vehicle of FIG. 2 may update its trajectory in response to detecting another object.

The AV will then use this data to update its trajectory over multiple cycles. (In this document, a "cycle" represents any period during which a vehicle collects any amount of perception data and processes that data for motion planning decisions.) This is illustrated by way of example in FIG. 3, in which the AV 201 has detected another object 204, which in this example is a parked vehicle. The other object 204 interferes with the AV's planned trajectory, so the AV must determine an updated trajectory 205 that avoids conflict with the other object 204. The AV's control system will then move the AV 201 along the updated trajectory.

Figure 4:
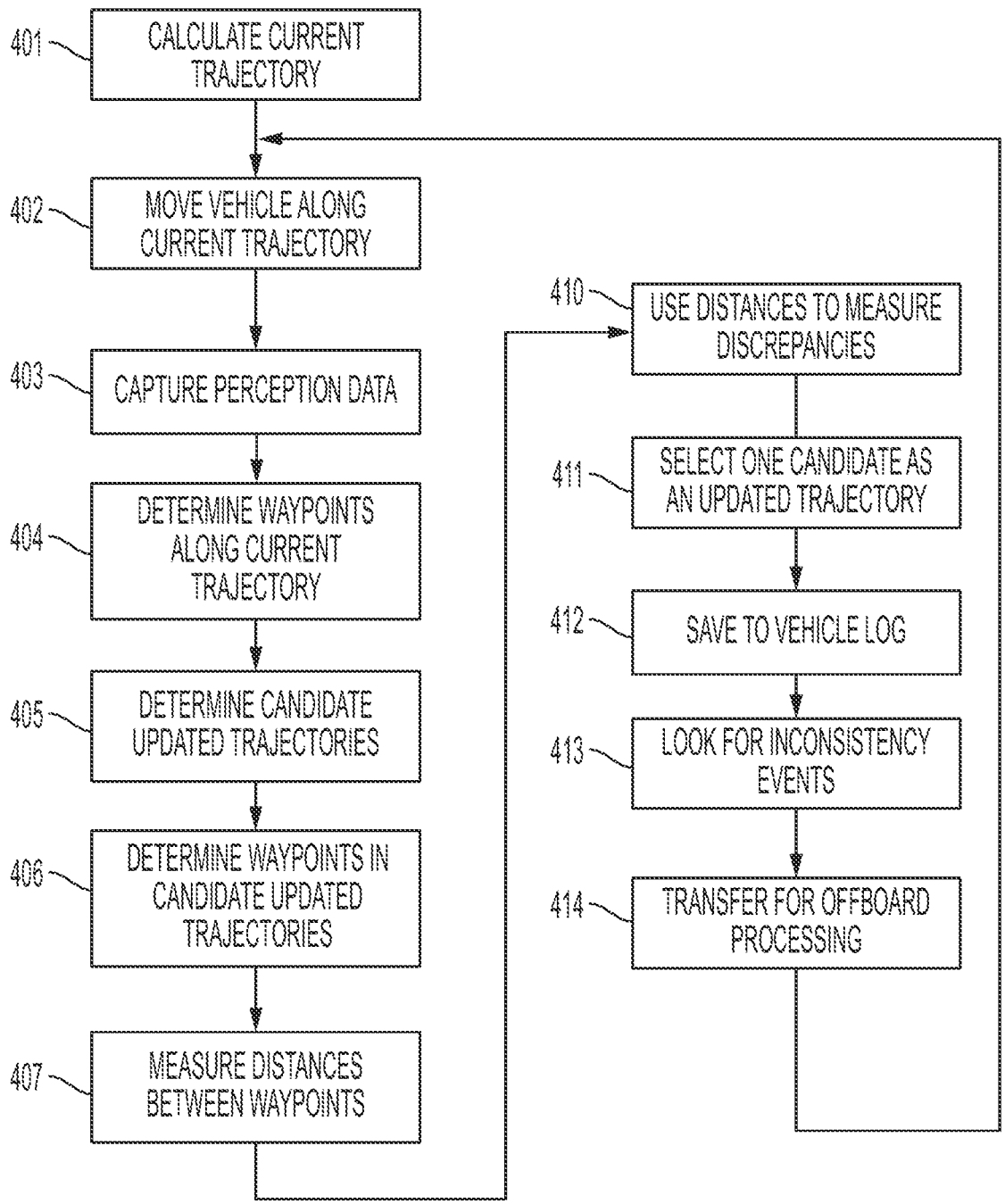
FIG. 4 is a flowchart illustrating a trajectory consistency assessment process.
Figure 7:
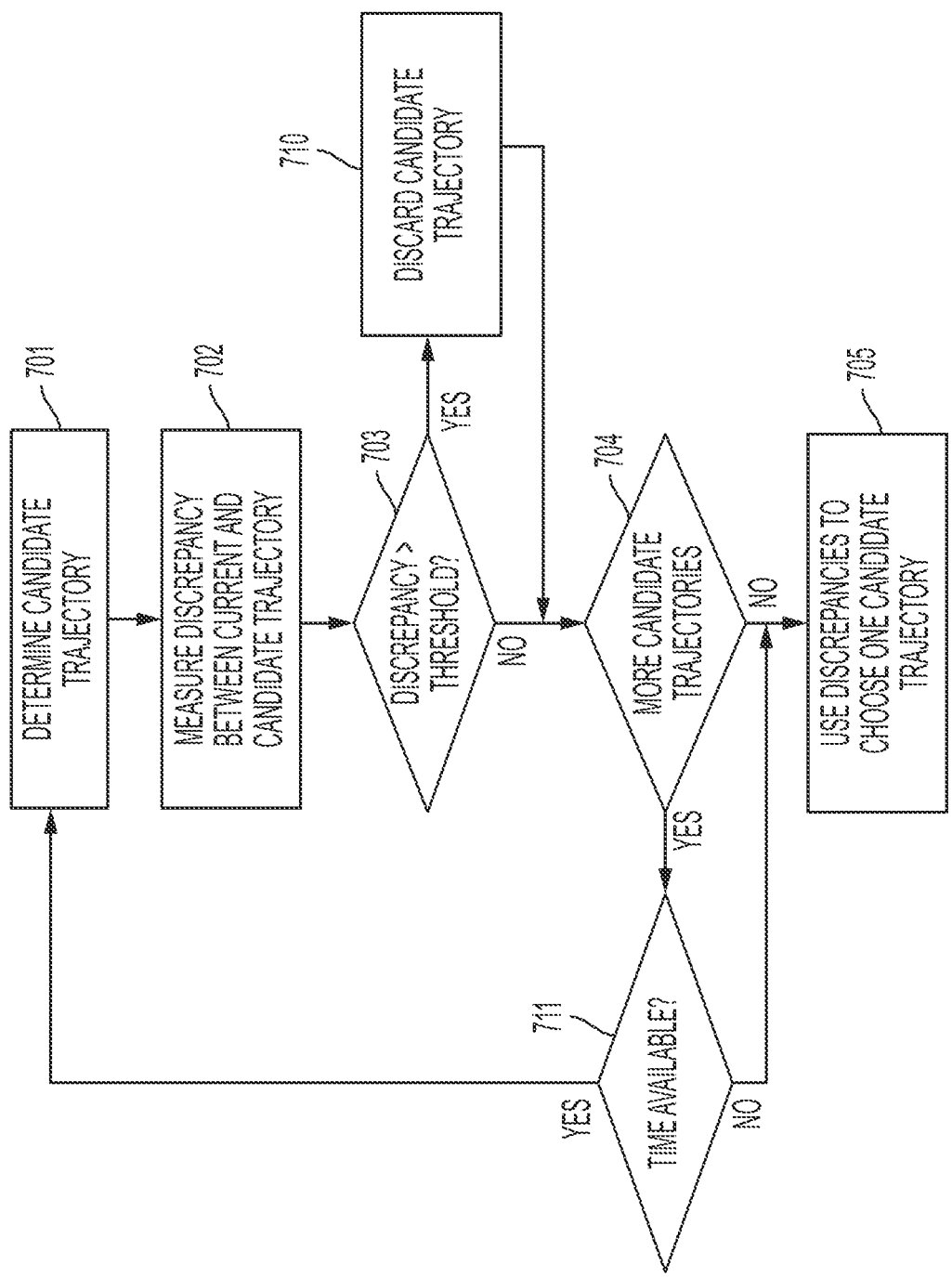
FIG. 7 is a flowchart illustrating a process by which an autonomous vehicle may consider more than one candidate trajectory and use trajectory consistency measurements in a motion planning process.

Repeated significant changes in an AV's trajectory can result in undesired ride quality, such as halts and jukes. It can also result in delayed reactions by the AV. To address this, FIG. 4 describes a process for updating trajectories. The process measures trajectory consistency or inconsistency over time, and it may favor trajectory consistency in a trajectory selection process. As the AV is moving through an environment, at 401 the AV's motion planning system will calculate a trajectory for moving the vehicle along a path. Any suitable trajectory calculation process may be used, including but not limited to those discussed in the context of FIGS. 1 and 7 of this document. When a trajectory is selected for execution by the AV's path following control system, this trajectory is termed the current trajectory. At 402 the AV's path following control system will cause the AV to move along the current trajectory. As described above, as the AV moves along the path, at 403 for each cycle over multiple cycles the AV's perception system will capture perception data about objects that are within the perception system's detection range. At 404 the system will identify various waypoints along the current trajectory. The waypoints may be temporal waypoints, assigned at periodic time intervals from the starting time of the current trajectory. Alternatively, the waypoints may be distance-based waypoints, assigned as the vehicle moves along specific distance intervals. Other methods of assigning waypoints may be used. At 405 the AV's motion planning system will use the perception data to calculate a set of candidate updated trajectories, using any suitable trajectory planning algorithm to do so. Example algorithms are discussed above in the discussion of FIG. 1, although the process is not limited to those examples.

Figure 5:
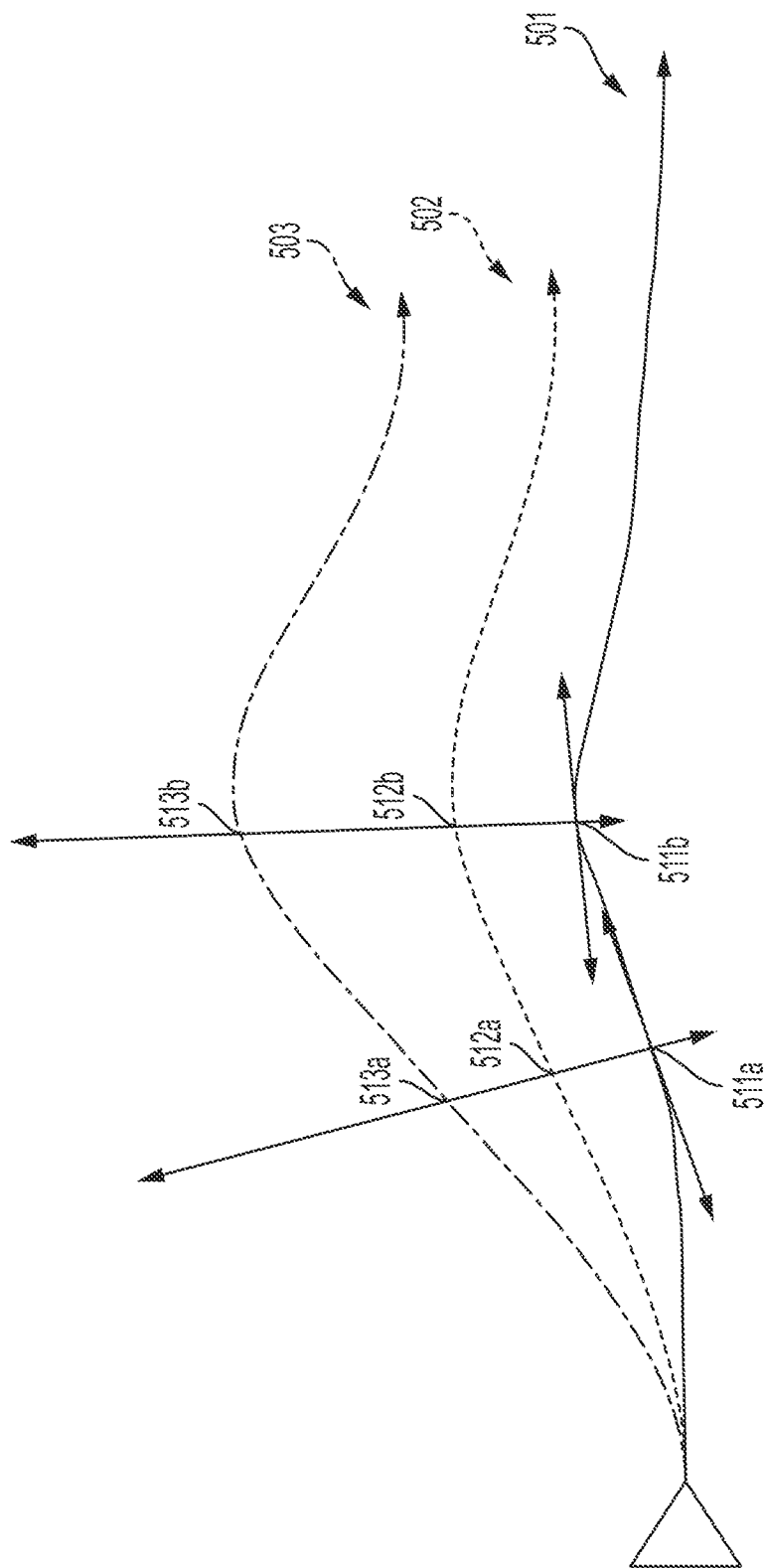
FIG. 5 illustrates an example comparison between waypoints of a current trajectory and an alternate trajectory.

At 410 the motion planning system will measure a discrepancy between each candidate updated trajectory and the current trajectory. To enable this, at 406 the system will interpolate a set of waypoints along each candidate updated trajectory, and the system will determine distances (at 407) between at least some of the waypoints of the current trajectory and at least some of the waypoints of the candidate updated trajectory. This is illustrated by way of example in FIG. 5, in which a current trajectory 501 includes waypoints 511*a* and 511*b*, Second candidate updated trajectory 502 includes interpolated waypoints 512*a* and 512*b*. Third candidate updated trajectory 503 includes interpolated waypoints 513*a* and 513*b*. The system may determine distances between a first corresponding pair of waypoints [511*a*, 512*a*], and any number of additional pairs of waypoints (such as [511*b*, 512*b*]) that are present in a planning time horizon along the time-axis, which is left to right in FIG. 5.

Figure 6:
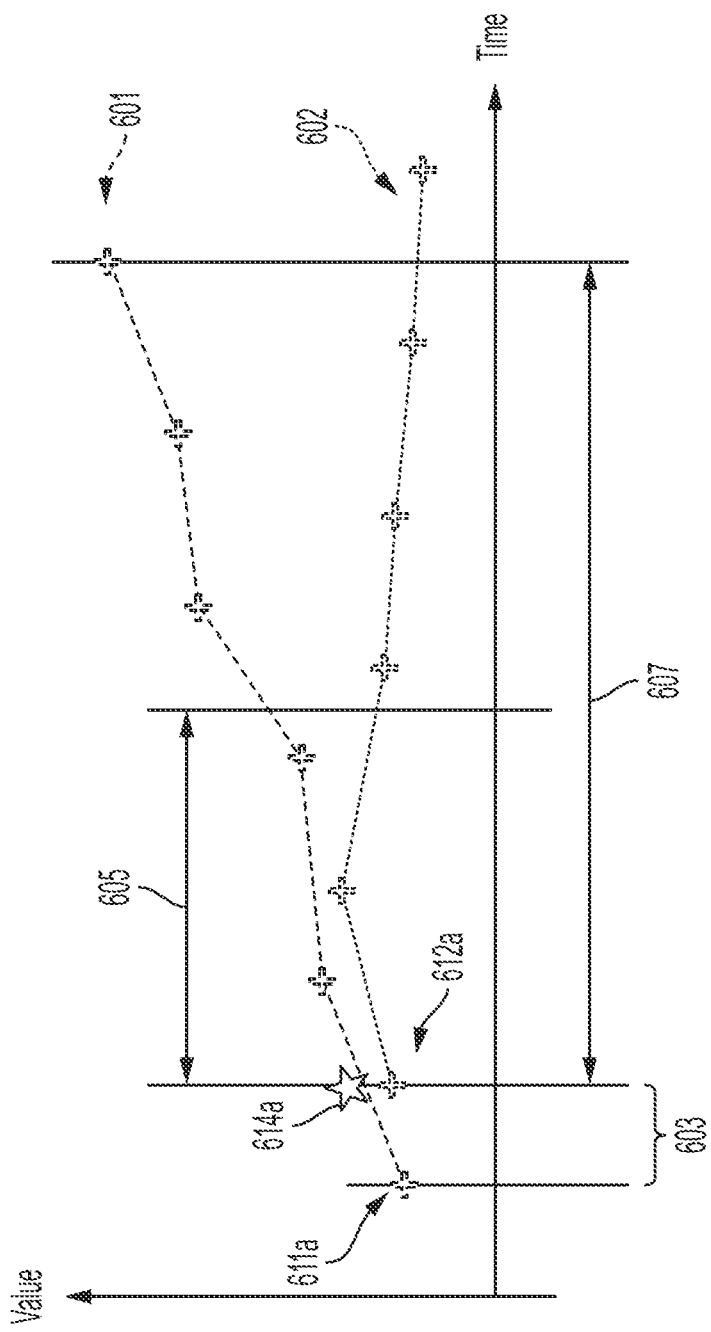
FIG. 6 illustrates how a system may time-adjust a current trajectory and an updated trajectory to assist in comparison of waypoints.

As described above in the discussion of FIG. 4, at 406 the system may interpolate the waypoints in the candidate updated trajectories. In the current trajectory and each candidate updated trajectory, temporal waypoints can each contain a time offset relative to the timestamp at which the trajectory was generated, along with various other parameters that the system intents the AV to achieve when it reaches the waypoint. However, because the trajectories are generated at different points in time, the typical temporal waypoints may not be aligned. This is illustrated by way of example in FIG. 6, in which the first waypoint 611*a* of the current trajectory 601 is not temporally aligned with the first waypoint 612*a* of the candidate updated trajectory 602, since the candidate updated trajectory 602 was generated after the current trajectory 601, as illustrated by start time difference 603. Thus, the system will start with the assigned waypoints in one of the trajectories and interpolate aligned waypoints in the other trajectory. For example, in FIG. 6, the system generates an interpolated waypoint 614*a* in the current trajectory 601, at a position along the x-axis that is time-aligned to the first waypoint 612*a* that is in the candidate updated trajectory 602. As an alternative to time-alignment, if the x-axis in FIG. 6 represented distance, then the system may interpolate distance-aligned waypoints in the same manner, in which case the waypoints of waypoint pair [612*a*, 614*a*] would be distance-aligned waypoints. The system may create waypoint pairs over an entire time horizon 607 for which data is available, or for a subset of the full time horizon such as selected comparison window 605.

Returning to FIG. 4, whether the waypoint pairs are time-aligned or distance-aligned, at 407 the system then measures a distance between the aligned waypoints of the current trajectory and the candidate updated trajectory. The system may do this in any number of possible ways. For example, in FIG. 6, the distance for waypoint pair [612*a*, 614*a*] is the vertical distance along the Y-axis between the two waypoints. The distance may represent an amount of lateral offset—that is, a distance by which a vehicle following the candidate trajectory will deviate from the current trajectory. The distance also may be a measure of the difference in the vehicle's heading between the two trajectories. (A vehicle's heading is its orientation; in other words, the direction in which the vehicle is facing.) The system may determine the distance using a method such as determining a reference axis that corresponds to the vehicle's heading in the current trajectory, and measuring the angle by which the direction of the vehicle's pose deviates from the reference axis in the updated trajectory. These are examples, and the system may use other distance measurement methods in various embodiments. The offset also may consider other characteristics of the vehicle, such as its position or its pose (which reflects both orientation and position).

Once the distances are measured at 407, then in step 410 the motion planning system will use the distances along with other parameters to measure a discrepancy between each candidate updated trajectory and the current trajectory. To measure the discrepancies, the system may apply the distances to any of several possible algorithms. For example, the system may aggregate the determined distances over a comparison window (that is, the planning time horizon) and calculate the discrepancy as: (i) the maximum absolute difference between any of the waypoint pairs; (ii) the maximum signed difference between any of the waypoint pairs; (iii) the minimum signed difference between any of the waypoint pairs; (iv) the root mean square error of the aggregated distances; or (v) a function of any of these and/or other parameters. In this context, "signed" differences are not absolute values but instead preserve the sign of the value. Using lateral offset as an example, these algorithms may have the following implementations with respect to current and candidate trajectories: (i) maximum absolute difference: the maximum lateral distance between corresponding waypoints on the current and candidate trajectories; (ii) maximum signed difference: the maximum distance to the left that the candidate trajectory takes the AV compared to the current trajectory; and (iii) minimum signed difference: the maximum distance to the right that the candidate trajectory takes the AV compared to the current trajectory.

At 411 the motion planning system will select one of the candidate trajectories as the updated trajectory that the AV will follow. This process is illustrated by way of example in FIG. 7, in which the AV's motion planning system will determine a first candidate updated trajectory at 701. At 702 The system will measure a discrepancy between the first candidate updated trajectory and the current trajectory, using a discrepancy measurement process such as that described above in the context of FIG. 4. Optionally, at 703 the system may determine whether the discrepancy is greater than a threshold. If the discrepancy is greater than a threshold, the system may discard that candidate trajectory and not consider it further at 710. The threshold may be a fixed value stored in memory, or the system may dynamically calculate the threshold using one or more parameters such as map data, traffic density data, weather data, and/or other parameters.

At 704 the system will continue to measure discrepancies as described above so long as additional candidate trajectories are available to assess. In some embodiments, a time limit may apply to discrepancy calculation (at 711), in which case the system will continue processing candidates until all candidate trajectories have been processed or the time limit is reached, whichever comes first. Either way, at 705 the system will use the discrepancies to select one of the candidate trajectories as the final trajectory to follow. (Step 705 in FIG. 7 corresponds to step 411 in FIG. 4.) The system may simply select the candidate trajectory having the lowest discrepancy. Alternatively, the system may use the discrepancy for each candidate trajectory as a parameter in a cost function that also considers other parameters. Other methods of using the discrepancy in the trajectory selection process may be used.

Returning to FIG. 4, the AV will then continue along the selected updated trajectory at 402, and the process will repeat over each cycle.

After the system chooses a candidate trajectory at 411 or at any point in the process, the system will store the discrepancies and/or other data in a vehicle log. The system may use the vehicle log to perform further analyses, such as looking for inconsistency events at 413. An inconsistency event is an event in which candidate trajectories are repeatedly inconsistent with current trajectories over a defined time period. To identify inconsistency events, the system may identify a time window that includes multiple cycles. The system may then determine a number of (in other words, the system may count how many) candidate updated trajectories had measured discrepancies which exceeded a discrepancy threshold value during the time window. If at least a minimum number of candidate updated trajectories had a measured discrepancy that exceeded the discrepancy threshold value, then the system may log the time window as an inconsistency event.

Optionally, at 413 the system may transfer some or all of the data from the vehicle log to an offboard processing system, such as by wireless transmission or a wired data transfer process. Optionally, when this happens, the offboard processing system may perform some or all of the analysis steps described above. For example, the offboard processing system may determine the number of candidate updated trajectories, determine whether at least the minimum number of candidate updated trajectories had a measured discrepancy that exceeded the discrepancy threshold value, and log the time window as an inconsistency event.

Figure 8:
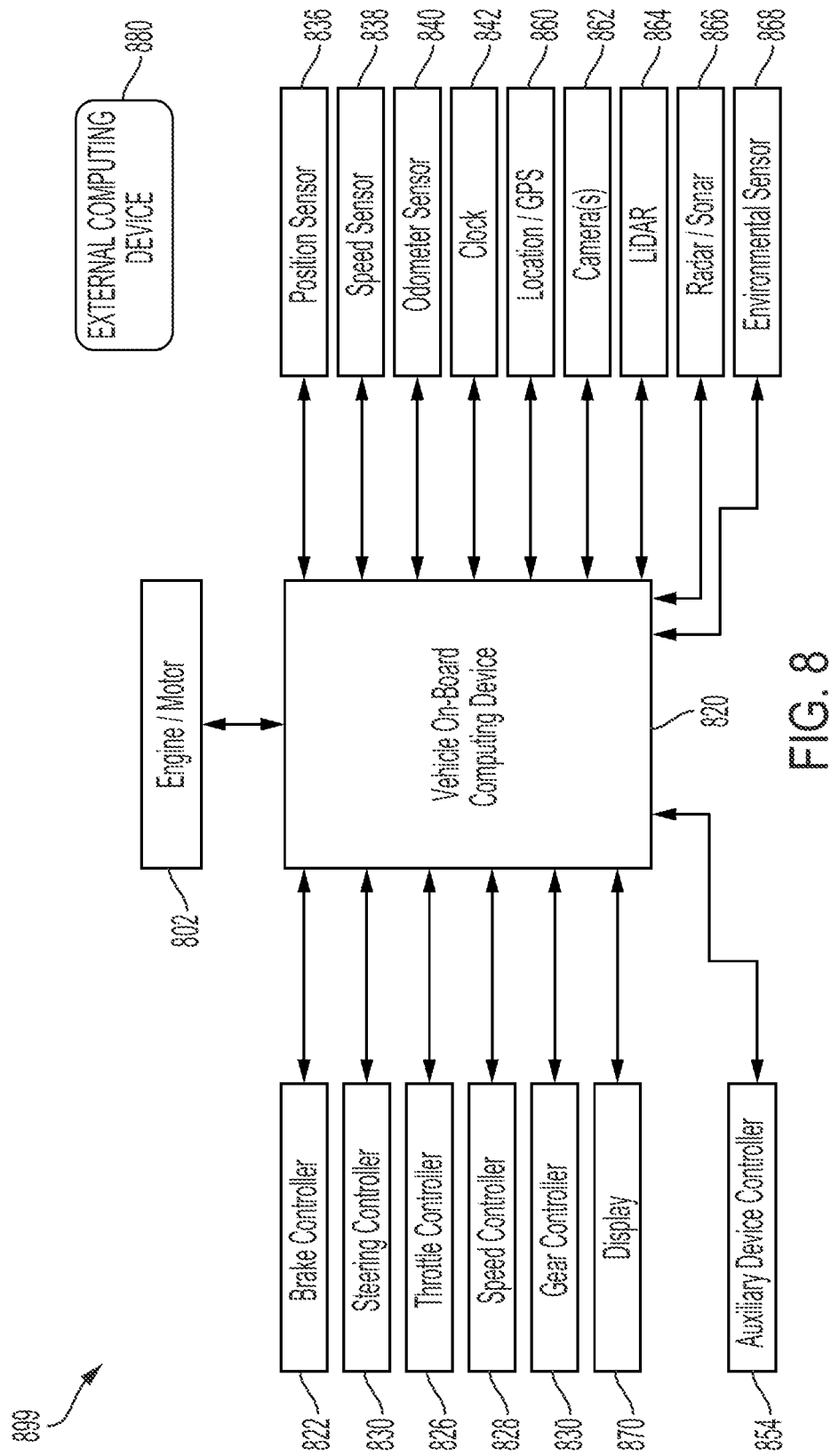
FIG. 8 illustrates example systems and components of an autonomous vehicle in further detail.

FIG. 8 illustrates an example system architecture 899 for a vehicle, such as an AV. The vehicle includes an engine or motor 802 and various sensors for measuring various parameters of the vehicle and/or its environment. Operational parameter sensors that are common to both types of vehicles include, for example: a position sensor 836 such as an accelerometer, gyroscope and/or inertial measurement unit; a speed sensor 838; and an odometer sensor 840. The vehicle also may have a clock 842 that the system uses to determine vehicle time during operation. The clock 842 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 860 such as a global positioning system (GPS) device; object detection sensors such as one or more cameras 862; a LiDAR sensor system 864; and/or a radar and/or a sonar system 866. The sensors also may include environmental sensors 868 such as a precipitation sensor and/or ambient temperature sensor. The object detection sensors may enable the vehicle to detect moving actors and stationary objects that are within a given distance range of the vehicle 899 in any direction, while the environmental sensors collect data about environmental conditions within the vehicle's area of travel. The system will also include one or more cameras 862 for capturing images of the environment. Any or all of these sensors will capture sensor data that will enable one or more processors of the vehicle's on-board computing device 820 and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle may encounter or affect in its environment.

During a run of the vehicle, information is communicated from the sensors to an on-board computing device 820. The on-board computing device 820 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 820 may control braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers.

Geographic location information may be communicated from the location sensor 860 to the on-board computing device 320, which may then access a map of the environment that corresponds to the location information to determine known fixed features of the environment such as streets, buildings, stop signs and/or stop/go signals. Captured images from the cameras 862 and/or object detection information captured from sensors such as a LiDAR system 864 is communicated from those sensors) to the on-board computing device 820. The object detection information and/or captured images may be processed by the on-board computing device 820 to detect objects in proximity to the vehicle 899. In addition or alternatively, the AV may transmit any of the data to an external computing device 880 for processing. Any known or to be known technique for performing object detection based on sensor data and/or captured images can be used in the embodiments disclosed in this document.

In addition, the AV may include an onboard display device 870 that may generate and output an interface on which sensor data, vehicle status information, or outputs generated by the processes described in this document are displayed to an occupant of the vehicle. The display device may include, or a separate device may be, an audio speaker that presents such information in audio format.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision-making and/or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network.

Figure 9:
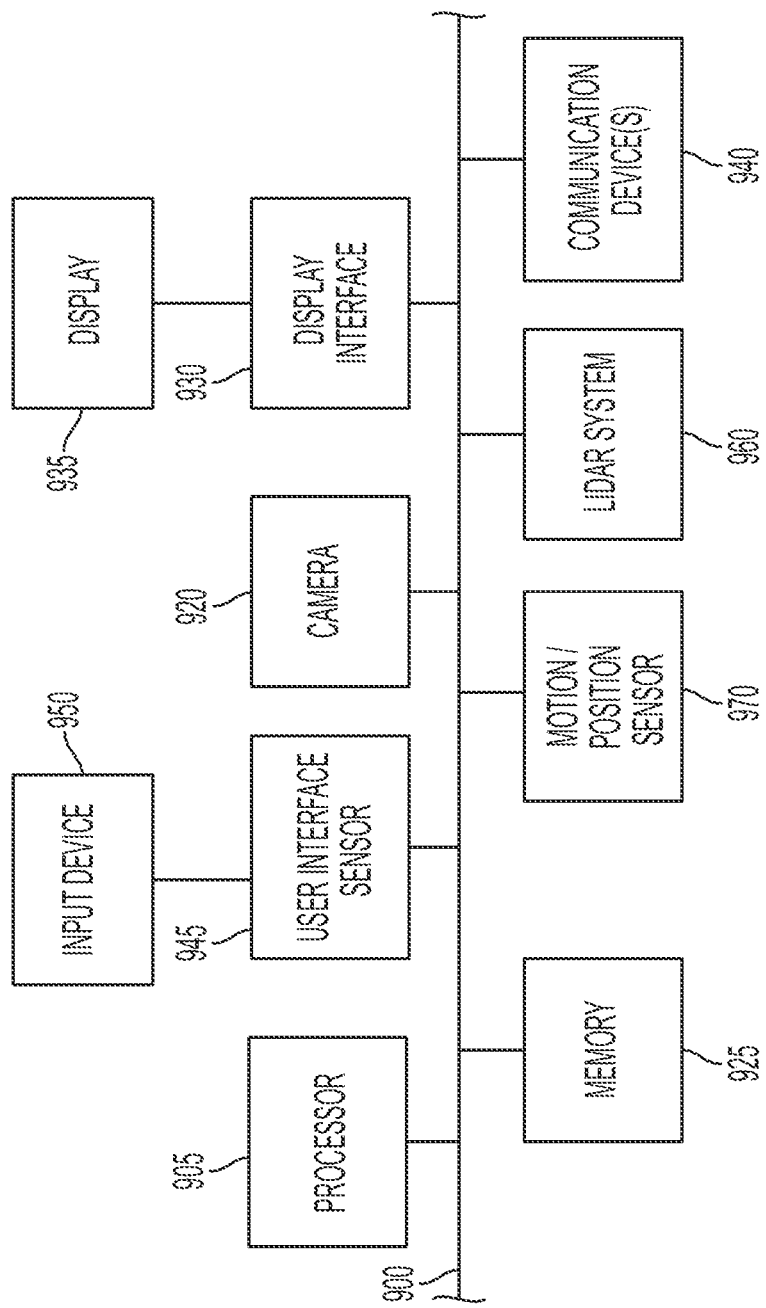
FIG. 9 is a block diagram that illustrates various elements of a possible electronic subsystem of an AV and/or external electronic device.

FIG. 9 depicts an example of internal hardware that may be included in any of the electronic components of the system, such as internal processing systems of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor"

and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format, such as an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may include and receive data via a LiDAR system 960, when used in the context of autonomous vehicles.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

The above-disclosed features and functions, as well as alternatives, may be combined into many other different systems or applications. Various components may be implemented in hardware or software or embedded software.

Various presently unforeseen or unanticipated alternatives, modifications, variations or improvements may be made by those skilled in the art, each of which is also intended to be encompassed by the disclosed embodiments.

The invention claimed is:

1. A method of refining a planned trajectory of an autonomous vehicle as the vehicle moves through an environment, the method comprising:
by a motion planning system of an autonomous vehicle, calculating a current trajectory for the vehicle;
by a control system of the vehicle, moving the vehicle along the current trajectory; and
for each cycle of a plurality of cycles as the vehicle moves along the current trajectory:
by a perception system of the vehicle, capturing perception data about a plurality of objects that are within a detection range of the perception system as the vehicle moves along the current trajectory,
by the motion planning system:
using the perception data to calculate a set of candidate updated trajectories;
measuring a discrepancy between each candidate updated trajectory and the current trajectory by:
determining a plurality of waypoints along the current trajectory and a plurality of waypoints along the candidate updated trajectory,
determining distances between at least some of the waypoints of the current trajectory and at least some of the waypoints of the candidate updated trajectory, and
using the distances to measure the discrepancy between the updated trajectory and the current trajectory;
storing the discrepancy in a vehicle log;
using the discrepancy to select, from the set of candidate updated trajectories, a final updated trajectory for the autonomous vehicle to follow;
identifying a time window that includes the plurality of cycles;
determining a number of candidate updated trajectories for which the measured discrepancy exceeded a discrepancy threshold value;
determining whether at least a minimum number of candidate updated trajectories had a measured discrepancy that exceeded the discrepancy threshold value; and
in response to determining that at least a minimum number of candidate updated trajectories had a measured discrepancy that exceeded the discrepancy threshold value, logging the time window as an inconsistency event.

2. The method of claim 1, wherein determining the plurality of waypoints along the current trajectory and the candidate updated trajectory comprises:
for either the current trajectory or the candidate updated trajectory, periodically assigning one of the waypoints at periodic intervals from a start time or distance; and
for the other of the current trajectory or the candidate updated trajectory using the assigned waypoints to generate interpolated waypoints at corresponding periodic intervals.

3. The method of claim 1, wherein using the distances to measure the discrepancy comprises:
aggregating the distances determined over a planning time horizon; and
measuring the discrepancy as a function of the aggregated distances, wherein the function comprises one or more of the following:
a maximum absolute value of the aggregated distances,
a maximum signed value of the aggregated distances,
a minimum signed value of the aggregated distances, or
root mean square error of the aggregated distances.

4. The method of claim 1, wherein using the distances to measure the discrepancies comprises, for each pair of aligned waypoints in the current trajectory and the candidate updated trajectory, measuring a difference in position, orientation, and/or pose of the vehicle.

5. The method of claim 1, wherein using the discrepancy to select the final updated trajectory comprises selecting the candidate updated trajectory having the smallest discrepancy.

6. The method of claim 1, wherein using the discrepancy to select the final updated trajectory comprises:
using the discrepancies for each candidate updated trajectory and one or more other parameters in a cost function for that candidate updated trajectory; and
selecting the candidate updated trajectory having the lowest cost.

7. The method of claim 1, further comprising:
transferring the vehicle log to an offboard processing system; and
wherein the offboard processing system determines the number of candidate updated trajectories, determines whether at least the minimum number of candidate updated trajectories had a measured discrepancy that exceeded the discrepancy threshold value, and logging the time window as an inconsistency event.

8. A system for operating an autonomous vehicle, the system comprising:
a motion planning system comprising a processor and programming instructions that are configured to cause the motion planning system to calculate a current trajectory for the vehicle;
a control system configured to move the vehicle along the current trajectory;
a perception system configured to, for each cycle of a plurality of cycles as the vehicle moves along the current trajectory, capture perception data about a plurality of objects that are within a detection range of the perception system,
wherein the motion planning system also comprises additional programming instructions that are configured to cause the motion planning system to:
use the perception data to calculate a set of candidate updated trajectories,
measure a discrepancy between each candidate updated trajectory and the current trajectory by:
determining a plurality of waypoints along the current trajectory and a plurality of waypoints along the candidate updated trajectory;
determining distances between at least some of the waypoints of the current trajectory and at least some of the waypoints of the candidate updated trajectory; and
using the distances to measure the discrepancy between the updated trajectory and the current trajectory,
store the discrepancy in a vehicle log, and
use the discrepancy to select, from the set of candidate updated trajectories, a final updated trajectory for the autonomous vehicle to follow; and an offboard processing system that is configured to:
identify a time window that includes the plurality of cycles,
receive the vehicle log from the vehicle,
determine whether at least a minimum number of candidate updated trajectories had a measured discrepancy that exceeded a discrepancy threshold value, and
log the time window as an inconsistency event.

9. The system of claim 8, wherein the instructions to determine the plurality of waypoints along the current trajectory and the plurality of waypoints along the candidate updated trajectory comprise instructions to:
for either the current trajectory or the candidate updated trajectory, periodically assigning one of the waypoints at periodic intervals from a start time or distance; and
for the other of the current trajectory or the candidate updated trajectory using the assigned waypoints to generate interpolated waypoints at corresponding periodic intervals.

10. The system of claim 8, wherein the instructions to use the distances to measure the discrepancy comprise instructions to:
aggregate the distances determined over a planning time horizon; and
measure the discrepancy as a function of the aggregated distances, wherein the function comprises one or more of the following:
a maximum absolute value of the aggregated distances,
a maximum signed value of the aggregated distances,
a minimum signed value of the aggregated distances, or
root mean square error of the aggregated distances.

11. The system of claim 8, wherein the instructions to use the distances to measure the discrepancies comprise instructions to, for each pair of aligned waypoints in the current trajectory and the candidate updated trajectory, measure a difference in position, orientation, and/or pose of the vehicle.

12. The system of claim 8, wherein the instructions to use the discrepancy to select the final updated trajectory comprise instructions to select the candidate updated trajectory having the smallest discrepancy.

13. The system of claim 8, wherein the instructions to use the discrepancy to select the final updated trajectory comprise instructions to:
use the discrepancies for each candidate updated trajectory and one or more other parameters in a cost function for that candidate updated trajectory; and
select the candidate updated trajectory having the lowest cost.

14. The system of claim 8 further comprising additional programming instructions to:
identify a time window that includes the plurality of cycles;
determine a number of candidate updated trajectories for which the measured discrepancy exceeded a discrepancy threshold value;
determine whether at least a minimum number of candidate updated trajectories had a measured discrepancy that exceeded the discrepancy threshold value; and
in response to determining that at least a minimum number of candidate updated trajectories had a measured discrepancy that exceeded the discrepancy threshold value, log the time window as an inconsistency event.

15. A computer program product comprising a computer-readable medium that holds programming instructions that that configured to cause one or more processors of a vehicle to:
control the vehicle to move along a current trajectory;
receive perception data captured by a perception system of the vehicle for each cycle of a plurality of cycles as the vehicle moves along the current trajectory, wherein the perception data includes parameters for a plurality of objects that are within a detection range of the perception system,
use the perception data to calculate a set of candidate updated trajectories;
measure a discrepancy between each candidate updated trajectory and the current trajectory by:
determining a plurality of waypoints along the current trajectory and a plurality of waypoints along the candidate updated trajectory,
determining distances between at least some of the waypoints of the current trajectory and at least some of the waypoints of the candidate updated trajectory, and
using the distances to measure the discrepancy between the updated trajectory and the current trajectory,
store the discrepancy in a vehicle log;
use the discrepancy to select, from the set of candidate updated trajectories, a final updated trajectory for the vehicle to follow;
identify a time window that includes the plurality of cycles;
determine a number of candidate updated trajectories for which the measured discrepancy exceeded a discrepancy threshold value;
determine whether at least a minimum number of candidate updated trajectories had a measured discrepancy that exceeded the discrepancy threshold value; and
in response to determining that at least a minimum number of candidate updated trajectories had a measured discrepancy that exceeded the discrepancy threshold value, log the time window as an inconsistency event.

16. The computer program product of claim 15, wherein the instructions to determine the plurality of waypoints along the current trajectory and the plurality of waypoints along the candidate updated trajectory comprise instructions to:
for either the current trajectory or the candidate updated trajectory, periodically assigning one of the waypoints at periodic intervals from a start time or distance; and
for the other of the current trajectory or the candidate updated trajectory using the assigned waypoints to generate interpolated waypoints at corresponding periodic intervals.

17. The computer program product of claim 15, wherein the instructions to use the distances to measure the discrepancy comprise instructions to:
aggregate the distances determined over a planning time horizon; and
measure the discrepancy as a function of the aggregated distances, wherein the function comprises one or more of the following:
a maximum absolute value of the aggregated distances,
a maximum signed value of the aggregated distances,
a minimum signed value of the aggregated distances, or
root mean square error of the aggregated distances.

18. The computer program product of claim 15, wherein the instructions to use the distances to measure the discrepancies comprise instructions to, for each pair of aligned waypoints in the current trajectory and the candidate updated trajectory, measure a difference in position, orientation, and/or pose of the vehicle.

19. The computer program product of claim 15, wherein the instructions to use the discrepancy to select the final updated trajectory comprise instructions to:
  use the discrepancies for each candidate updated trajectory and one or more other parameters in a cost function for that candidate updated trajectory; and
  select the candidate updated trajectory having the lowest cost.

* * * * *